(12) United States Patent
Allard et al.

(10) Patent No.: US 11,045,975 B2
(45) Date of Patent: *Jun. 29, 2021

(54) EXTRUSION COMPONENTS FOR HONEYCOMB BODIES

(71) Applicant: Corning Incorporated, Corning, NY (US)

(72) Inventors: John Wilbur Allard, Kaiserslautern (DE); Thomas William Brew, Corning, NY (US); Tushar Gulati, Painted Post, NY (US); Helmut Roland Letzel, Herschweiler-Pettersheim (DE); Min Shen, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 126 days.

This patent is subject to a terminal disclaimer.

(21) Appl. No.: 16/077,117

(22) PCT Filed: Feb. 13, 2017

(86) PCT No.: PCT/US2017/017653
§ 371 (c)(1),
(2) Date: Aug. 10, 2018

(87) PCT Pub. No.: WO2017/139753
PCT Pub. Date: Aug. 17, 2017

(65) Prior Publication Data
US 2019/0054654 A1 Feb. 21, 2019

Related U.S. Application Data

(60) Provisional application No. 62/295,384, filed on Feb. 15, 2016, provisional application No. 62/294,199, filed on Feb. 11, 2016.

(51) Int. Cl.
*B28B 3/00* (2006.01)
*B28B 3/26* (2006.01)
(Continued)

(52) U.S. Cl.
CPC .............. *B28B 3/269* (2013.01); *B29C 48/11* (2019.02); *B28B 2003/203* (2013.01)

(58) Field of Classification Search
CPC ............................... B28B 3/269; B29C 48/11
See application file for complete search history.

(56) References Cited

U.S. PATENT DOCUMENTS

| 3,947,214 A | 3/1976 | Cunningham |
| 4,233,351 A | 11/1980 | Okumura et al. |

(Continued)

FOREIGN PATENT DOCUMENTS

| CN | 101549523 A | 10/2009 |
| WO | 2017087758 A1 | 5/2017 |

OTHER PUBLICATIONS

Japanese Patent Application No. 2018542742; Notice of Allowance dated Sep. 25, 2019; Japan Patent Office; 3 Pgs.
(Continued)

*Primary Examiner* — Timothy Kennedy
(74) *Attorney, Agent, or Firm* — Kurt R. Denniston

(57) ABSTRACT

A honeycomb extrusion die comprising at least some slots (308) each with a divot (312) spaced toward a discharge surface (324) from a feedhole-slot intersection (332) and a wide portion at the discharge surface extending into the die body (358) to the divot (312) to strengthen a peripheral region of a honeycomb extrudate in a reinforcement region, and a bulk nominal section corresponding to a bulk region of the honeycomb body.

22 Claims, 6 Drawing Sheets

(51) Int. Cl.
*B29C 48/11* (2019.01)
*B28B 3/20* (2006.01)

(56) References Cited

U.S. PATENT DOCUMENTS

| | | | |
|---|---|---|---|
| 4,278,412 | A | 7/1981 | Ozaki et al. |
| 4,333,896 | A | 6/1982 | Cunningham |
| 4,349,329 | A | 9/1982 | Naito et al. |
| 4,668,176 | A | 5/1987 | Zeibig et al. |
| 4,915,612 | A | 4/1990 | Gangeme et al. |
| 5,952,079 | A | 9/1999 | Andou et al. |
| 6,080,348 | A | 6/2000 | Shalkey |
| 6,287,103 | B1 | 9/2001 | Miyazaki |
| 6,299,813 | B1 | 10/2001 | Brew et al. |
| 6,343,923 | B1 | 2/2002 | Cunningham et al. |
| 6,413,072 | B1 | 7/2002 | Brew et al. |
| 6,455,124 | B1 | 9/2002 | Beall et al. |
| 7,163,389 | B2 | 1/2007 | Miyazaki et al. |
| 7,914,724 | B2 | 3/2011 | Bookbinder et al. |
| 8,128,395 | B2 * | 3/2012 | Shindo .................. B28B 3/269 425/380 |
| 8,348,659 | B2 | 1/2013 | Foster et al. |
| 8,591,287 | B2 | 11/2013 | Folmar et al. |
| 9,475,245 | B2 | 10/2016 | Brew et al. |
| 2004/0131512 | A1 * | 7/2004 | Abe .................. B01D 46/0024 422/180 |
| 2004/0161583 | A1 | 8/2004 | Brew et al. |
| 2005/0147707 | A1 * | 7/2005 | Nate .................. B28B 3/26 425/380 |
| 2006/0178769 | A1 | 8/2006 | Brew et al. |
| 2007/0026188 | A1 | 2/2007 | Bookbinder et al. |
| 2009/0028979 | A1 | 1/2009 | Asaoka |
| 2009/0028981 | A1 | 1/2009 | Asaoka |
| 2010/0052205 | A1 | 3/2010 | Brew et al. |
| 2010/0301515 | A1 | 12/2010 | Brew et al. |
| 2011/0052745 | A1 | 3/2011 | Corbett et al. |
| 2014/0060253 | A1 | 3/2014 | Brew et al. |

OTHER PUBLICATIONS

International Search Report and Written Opinion of the International Searching Authority; PCT/US2017/017651; dated May 9, 2017; 12 Pages; European Patent Office.
International Search Report and Written Opinion of the International Searching Authority; PCT/US2017/017653; dated May 30, 2017; 14 Pages; European Patent Office.
English Translation of CN201780011196.6 Office Action dated Jul. 12, 2019; 6 Pages; Chinese Patent Office.

* cited by examiner

EXTRUSION COMPONENTS FOR HONEYCOMB BODIES

CROSS-REFERENCE TO RELATED APPLICATION

This application is a national stage application under 35 U.S.C. § 371 of International Patent Application Serial No. PCT/US17/17653, filed on Feb. 13, 2017, which claims the benefit of priority to U.S. Provisional Patent Application Ser. No. 62/294,199 filed on Feb. 11, 2016 and U.S. Provisional Patent Application Ser. No. 62/295,384 filed on Feb. 15, 2016, the contents of which each are relied upon and incorporated herein by reference in their entireties.

BACKGROUND

Field

Exemplary embodiments of the present disclosure relate to extrusion dies and methods of using same to make honeycomb bodies and, more particularly, to extrusion dies to extrude ceramic compositions, and methods of manufacturing honeycomb bodies of ceramic compositions using same.

Discussion of the Background

Cleaning of fluids such as air filtration and after-treatment of exhaust gas from internal combustion engines may use catalysts supported on high-surface area substrates and filters. Filters and catalyst supports in these applications may be refractory, thermal shock resistant, stable under a range of $pO_2$ conditions, non-reactive with the catalyst system, and offer low resistance to fluid flow. Honeycomb bodies comprising porous ceramic flow-through honeycomb substrates and wall-flow honeycomb filters may be used in these applications.

The manufacture of ceramic honeycomb bodies may be accomplished by the process of extruding ceramic powder batch mixtures through honeycomb extrusion dies to form honeycomb extrudate, and drying and firing the extrudate to produce ceramic honeycombs of high strength and thermal durability. The ceramic honeycombs thus produced are widely used as ceramic catalyst supports and wall-flow particulate filters for cleaning fluids.

Honeycomb extrusion dies can comprise a plurality of feedholes and an array of pins that are spaced apart to define a honeycomb network of discharge slots. The die may be mounted to portions of an extrusion apparatus to extrude the honeycomb bodies from the batch of ceramic and/or ceramic-forming material.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide a honeycomb extrusion die.

Exemplary embodiments of the present disclosure also provide a method of manufacturing a honeycomb extrusion die.

Exemplary embodiments of the present disclosure also provide a method of manufacturing a honeycomb body.

Exemplary embodiments of the present disclosure also provide a honeycomb body.

Additional features of the disclosure will be set forth in the description which follows, and in part will be apparent from the description, or may be learned by practice of the disclosure.

An exemplary embodiment discloses a honeycomb extrusion die, comprising a die body. The die body comprises an inlet surface and a discharge surface opposite the inlet surface, feedholes extending from the inlet surface into the die body, and an intersecting array of discharge slots extending into the die body from the discharge surface to connect with the feedholes at intersections within the die body, the intersecting array of discharge slots being formed by side surfaces of a plurality of pins bounded by the slots and extending into the die body from the discharge face. At least some of the side surfaces of the pins forming the walls of the slots comprise a divot spaced apart from the feedhole-slot intersection and spaced apart from the discharge surface. The plurality of slots comprise a first group of the slots comprising a width W1 between adjacent pins at the discharge surface, and a second group of the slots comprising a second width W2, greater than W1, between adjacent pins at the discharge surface.

An exemplary embodiment also discloses a method of manufacturing a ceramic article. The method comprises extruding a batch material through the honeycomb extrusion die.

An exemplary embodiment also discloses a honeycomb body comprising intersecting walls of a nominal thickness in a bulk region of the honeycomb extrudate and intersecting walls of a greater thickness in a strengthened region of the honeycomb extrudate surrounding the bulk region.

An exemplary embodiment also discloses a honeycomb extrusion die, comprising at least two adjacent pins comprising first facing sides bounding a slot, wherein the first facing sides comprise: a feed section bounding a slot upstream portion configured to receive batch from a feedhole, a divot section bounding a slot divot portion, and a discharge section bounding a slot discharge portion configured to discharge batch at a discharge surface, wherein the slot divot portion is disposed between the slot upstream portion and the slot discharge portion, and the slot divot portion is wider than the slot upstream portion and the slot discharge portion, and the slot discharge portion is wider than the slot upstream portion. In some aspects of these exemplary embodiments of the honeycomb extrusion die, the slot discharge portion comprises a constant width from the slot divot portion to the discharge surface.

An exemplary embodiment also discloses a honeycomb extrusion die, comprising a die body. The die body comprises an inlet surface and a discharge surface opposite the inlet surface, feedholes extending from the inlet surface into the die body, and an intersecting array of discharge slots extending into the die body from the discharge surface to connect with the feedholes at intersections within the die body, the intersecting array of discharge slots being formed by side surfaces of a plurality of pins bounded by the slots and extending into the die body from the discharge face. At least some of the side surfaces of the pins forming the walls of the slots comprise a plenum spaced apart from the discharge surface. The plurality of slots comprise a first group of the slots comprising a width W1 between adjacent pins at the discharge surface, and a second group of the slots comprising a second width W2, greater than W1, between adjacent pins at the discharge surface.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION

Figure 1:
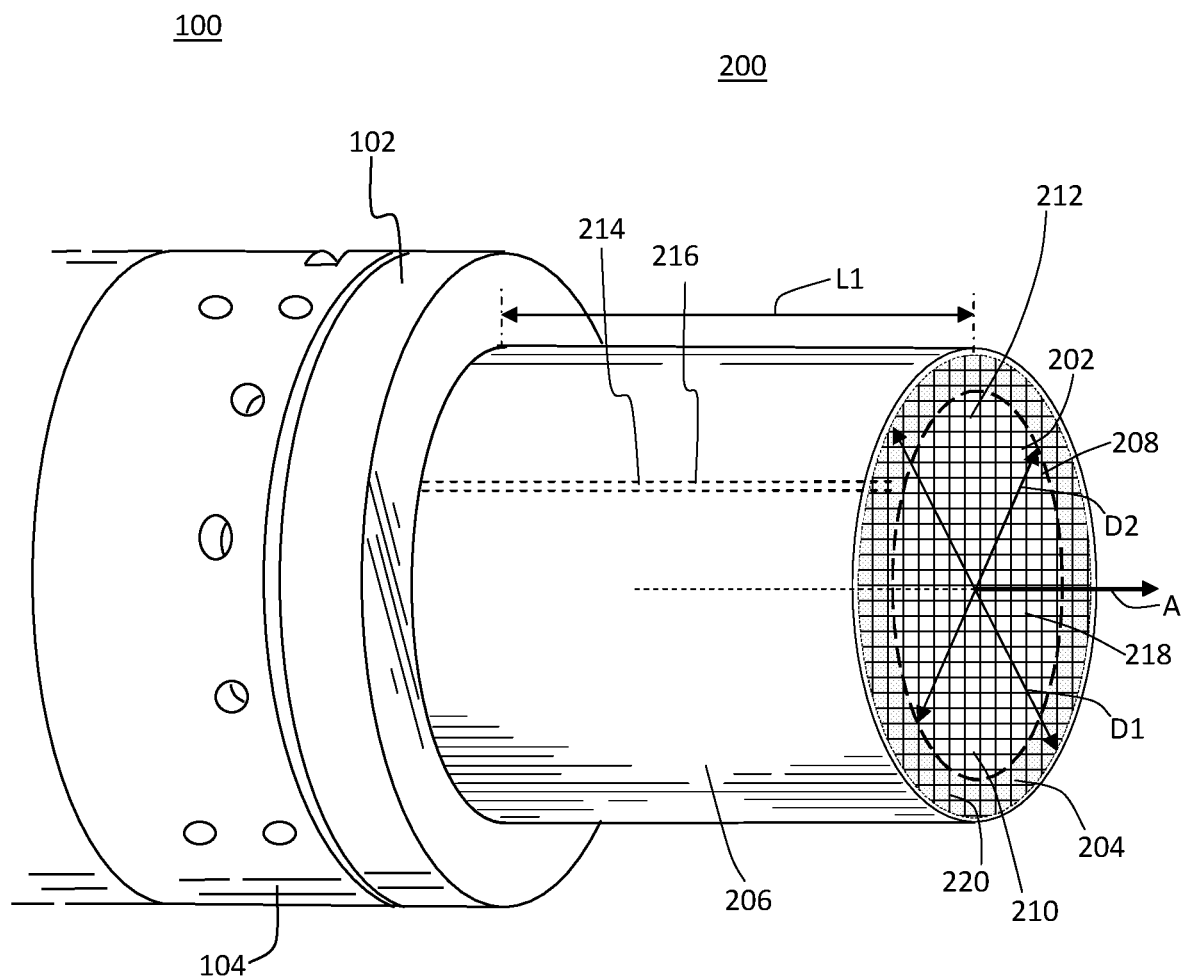
FIG. 1 is a schematic illustration of an extruder front end and a honeycomb extrudate.

The disclosure is described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these embodiments are provided so that this disclosure is thorough, and will fully convey the scope of the disclosure to those skilled in the art. In the drawings, the size and relative sizes of layers and regions may be exaggerated for clarity.

It will be understood that when an element or layer is referred to as being "on", "connected to", or "adjacent to" another element or layer, it can be directly on, directly connected to, or directly adjacent to the other element or layer, or intervening elements or layers may be present. In contrast, when an element or layer is referred to as being "directly on", "directly connected to", or "directly adjacent to" another element or layer, there are no intervening elements or layers present. Like reference numerals in the drawings denote like elements. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

The manufacture of porous ceramic honeycomb bodies may be accomplished by the process of plasticizing ceramic powder batch mixtures, extruding the mixtures through honeycomb extrusion dies to form honeycomb bodies, and cutting, drying, and firing the bodies to produce porous ceramic honeycomb bodies of high strength and thermal durability having channels extending axially from a first end face to a second end face. Upon exiting the extruder in an axial direction, the batch stiffens into a wet extrudate comprising a network of axially extending intersecting walls (webs) that form axially extending channels and an axially extending outer peripheral surface. The webs and channels comprise the matrix. Disposed at the outer periphery of the matrix is the outer peripheral surface. The outer peripheral surface may be referred to herein as a co-extruded skin, an integrally formed co-extruded skin, or skin. A green ware honeycomb body or porous ceramic honeycomb body extruded with the skin on the matrix is referred to herein as an extrude-to-shape honeycomb body. As used herein a ceramic honeycomb body includes ceramic honeycomb monoliths and ceramic segmented honeycomb bodies, as well as the honeycomb body segments. As used herein honeycomb body can refer to a wet or dried green ware, or fired ware, honeycomb extrudate, honeycomb log, honeycomb piece, or honeycomb article.

A co-extruded or an after-applied exterior skin may form an outer peripheral surface extending axially from a first end face to a second end face of the ceramic honeycomb body. Each channel of the honeycomb body defined by intersecting walls (webs), whether monolithic or segmented, can be plugged at an inlet face or an outlet face to produce a filter. When some channels are left unplugged a partial filter can be produced. The honeycomb body, whether monolithic or segmented, can be catalyzed to produce a substrate. A non-plugged honeycomb body is generally referred to herein as a substrate. The catalyzed substrate can have an after applied catalyst or comprise an extruded catalyst. Further, filters and partial filters can be catalyzed to provide multi-functionality. The ceramic honeycomb bodies thus produced are widely used as catalyst supports, membrane supports, as wall-flow filters, as partial filters, and as combinations thereof for cleaning fluids such as purifying engine exhausts.

Ceramic honeycomb body compositions are not particularly limited and can comprise major and minor amounts of cordierite, aluminum-titanate, mullite, β-spodumene, silicon carbide, zeolite and the like, and combinations thereof. As a further example, the ceramic honeycomb body can comprise an extruded zeolite or other extruded catalyst.

FIG. 1 is a schematic illustration of an extruder and a honeycomb extrudate. The extruder can include a front end 102 where the batch exits the extruder 100 as the honeycomb extrudate 200. An extruder cartridge 104 can include extrusion hardware including an extrusion die and skin forming mask. The honeycomb extrudate 200 has a length L1 and includes a first end face 202 and an outer peripheral surface 206 extending from the extruder front end 102 to the first end face 202. A plurality of intersecting walls 208 that form mutually adjoining channels 210 extend in the extrusion direction indicated by axial direction "A" and form a honeycomb matrix 212. Intersecting walls 214 forming a channel 216 extending in the extrusion direction are shown for illustration. A maximum cross sectional dimension perpendicular to the axial direction is indicated by "D1". For example, when the honeycomb extrudate 200 is a cylinder shape, the maximum dimension "D1" may be a diameter of an end face 202. For example, when the honeycomb extrudate 200 cross section perpendicular to the axial direction is a rectangular shape, the maximum dimension "D1" may be a diagonal of an end face.

The honeycomb matrix 212 according to exemplary embodiments of the disclosure comprises intersecting walls 208 of a nominal thickness in a bulk region 218 of the honeycomb extrudate 200 and intersecting walls 204 of a greater thickness in a strengthened region 220 (herein referred to as "reinforcement" region) of the honeycomb extrudate 200 surrounding the bulk region 218. The bulk region 218 may be bounded by a second dimension "D2" less than "D1". The strengthened region 220 may extend from "D2" to "D1" or from "D2" to less than "D1". The thicker walls in the peripheral region 220 provide a strengthening effect to the honeycomb extrudate 200. The reinforcement region 220 can extend to the outer periphery of the honeycomb extrudate 200. The honeycomb extrudate 200 can be cut to form a second end face, dried and fired to form a porous ceramic honeycomb body having the strengthened peripheral region 220 of thicker channel walls 204. In other exemplary embodiments the reinforcement region may cross the bulk region, such as on the 45° directions for a square matrix or the 60° directions for a hexagonal matrix.

An extrusion die, typically formed of a high strength material such as stainless steel, includes a die body provided with feedholes into which a plasticized ceramic batch material is introduced into the die. Connecting with the feedholes are discharge slots terminating on a discharge face of the die from which the plasticized batch material is discharged in the form of the honeycomb extrudate 200 having an outer extruded skin 206 surrounding the shape and adhering to peripheral walls 204.

For the purpose of producing stronger peripheral walls 204 having greater thickness than interior walls 208, widened peripheral discharge slots are provided. Slot widening can be accomplished by plunge EDM machining with a tab electrode of a suitable width. As expected, the result of this slot widening is a thickened peripheral honeycomb body wall intended to impart added strength to the dried and fired honeycomb structure. An unintended result, however, can be distortion of the thickened peripheral walls, such distortion interfering with the desired strengthening and in some cases reducing the strength of the fired honeycomb bodies.

It has been found that to extrude a honeycomb body with the peripheral reinforcement region 220, the batch flow impedance (pressure drop) needs to be appropriately lower in the reinforcement zone with wide slot width of the die periphery than in the bulk zone of the die center with nominal slot width and that the closer to the skin, the lower the flow impedance needs to be where the wide slots become progressively wider. Accordingly, the flow distribution at die feedholes will naturally lead to more flow to the reinforcement zone than to the nominal zone, and the closer to the skin, the more the batch will flow to the wider slots. Such an arrangement is needed for the peripheral reinforcement section since such flow enables well filled wide slots resulting in the wide honeycomb body walls at a consistent extrusion speed with interior walls 208 balancing the mass flow.

However, the inventors have found that the batch flow distribution at die feedholes does not naturally lead to more flow to the reinforcement zone than to the nominal zone, and the closer to the skin, as the die slots become wider, more of the batch does not flow to the wider slots. In fact, it was surprisingly found that the opposite was true; the batch flow impedance in the reinforcement zone was even higher than the flow impedance in the nominal zone and the impedance even increased as the slots got wider closer to the skin. The investigation into this surprising effect with die flow modeling indicated that the slot expansion in the reinforcement section can lead to a downstream facing (forward facing) step for batch flow. The forward facing step can cause the additional pressure drop due to batch sliding over batch caught in an eddy or "dead zone" when the wide slot is well filled with batch (referred to herein as batch-on-batch). The additional pressure can override the pressure reduction in the expanded slot and lead to a higher pressure drop through the reinforcement section. The batch-on-batch pressure was found to increase when closer to the outer periphery because of the wider expansion of the slot in the reinforcement section. The increased impedance trend leads to less flow in the reinforcement section that becomes even less batch flow, dropping off toward the skin which is opposite to what is needed to extrude an acceptable reinforcement region in the honeycomb body. Hence, to establish the correct batch flow in the wide slots of the reinforcement zone, the impedance profile needs to decrease in the reinforcement zone.

In addition to the forward facing step causing higher impedance in the reinforcement zone, the forward facing step can also lead to another stable state in the reinforcement zone with a constant lower impedance, but with the wide slot not well filled to its designed dimension. Both the batch-on-batch with increased impedance stable state and the unfilled wide slot with lower impedance stable state are undesirable during the extrusion process because either of these stable states (together referred to herein as bi-stable state) will lead to incorrect batch flow and extrusion defects in the extruded honeycomb body. To avoid defects from the bi-stable state the forward facing step in the slots of the reinforcement zone can be removed. However, removing the forward facing step can require the wide slot extend to the pin root which can lead to too great of a reduction in pressure drop and excessive batch flow in the reinforcement zone and some die geometries are not conducive to such an extension to the pin root.

As set forth in U.S. Pat. No. 6,080,348, the entire contents of which are hereby incorporated by reference as if fully set forth herein, pins bounding discharge slots of a die can incorporate side surfaces which include geometrically designed surface features for modifying the flow of extrudable material past the die. These geometrically designed surface features are referred to herein as divots. Divots can be grooves or recesses formed in selected side surfaces of die pins which act to introduce shear within the extrudable material, thereby somewhat impeding its flow past the pin surfaces incorporating the recess. The divots can be spaced away from both the discharge face of the die formed by the top surfaces of pins and also from the feedhole-slot intersections formed between feedholes and discharge slots within the body of the die.

Divots are features of a predetermined size and shape impressed upon a pin or slot surface of the honeycomb extrusion die. This is in contradistinction to random surface variations of the kind typically present in the slot regions of extrusion dies machined in accordance with prior practice.

The flow modifications which will develop in the plasticized batch material due to the presence of divots in the discharge slots will depend not only on the number, size and shape of the divots, but also on factors such as the rheology of the material being extruded and the extrusion rates employed. However, the optimum divot geometry for any particular batch material, honeycomb body shape, and/or extrusion condition may readily be determined by routine experiment or flow modeling. The discharge slot is wider at the divot than portions of the slot upstream and downstream of said divot.

The inventors surprisingly found that for a die with at least some slots comprising divots and for a die with at least some slots comprising divots and plenum, the proper impedance profile in the reinforcement zone can be achieved without extending the wide slot to the pin root, which may cause too much batch flow in reinforcement zone, but to the downstream edge of the divot instead. The extrusion die comprising the wide slot of the reinforcement zone extending from the discharge surface to the downstream edge of the divot can provide the right pressure drop profile and consequently is capable of providing self-sufficient batch flow in the reinforcement slot region while reducing or eliminating the bi-stable state of batch flow and associated defects.

First exemplary embodiments of the disclosure relate to a new die design comprising at least some of the die slots each with a divot spaced toward a discharge surface from the intersection with the feedholes and a wide portion at the discharge surface extending into the die body but spaced away from the divot in a peripheral region surrounding a bulk region of nominal slot width at the discharge surface to strengthen a peripheral region of a honeycomb extrudate according to exemplary embodiments of the disclosure. According to these exemplary embodiments, the die is capable of producing honeycomb bodies with progressively increased wall width towards the outer periphery. According to these exemplary embodiments, extrusion through the die exhibits target wall thickness in the reinforcement region of the honeycomb body.

Second exemplary embodiments of the disclosure relate to a new die design comprising at least some of the die slots each with a divot spaced toward a discharge surface from the intersection with the feedholes and a wide portion at the discharge surface extending into the die body to the divot in a peripheral region surrounding a bulk region of nominal slot width at the discharge surface to strengthen a peripheral region of a honeycomb extrudate according to exemplary embodiments of the disclosure. These embodiments exploit the interaction between a wider slot portion and a divot to avoid bi-stable state of batch flow and added pressure from batch on batch flow and therefore, provide the impedance profile needed for correct batch flow in the wide slot portions of the reinforcement region. According to these exemplary embodiments, the die is capable of producing honeycomb bodies with progressively increased wall width towards the outer periphery. According to these exemplary embodiments, extrusion through the die exhibits well filled peripheral die slots leading to meeting target wall thickness in the reinforcement region of the honeycomb body and avoids extrusion defects such as wall distortion near the periphery and tearing between the reinforcement region and the bulk region of the honeycomb body.

According to these second exemplary embodiments the divot can be disposed at a location along the depth of the slot to provide optimum peripheral flow to bulk flow balance while maintaining the contributions of the divot to reduced flow defects such as non-knitters and warped webs and firing defects such as cracks in the porous ceramic walls, and the reinforcement region providing improved strength to the honeycomb body such as higher isostatic strength and reduced chipping.

Figure 2:
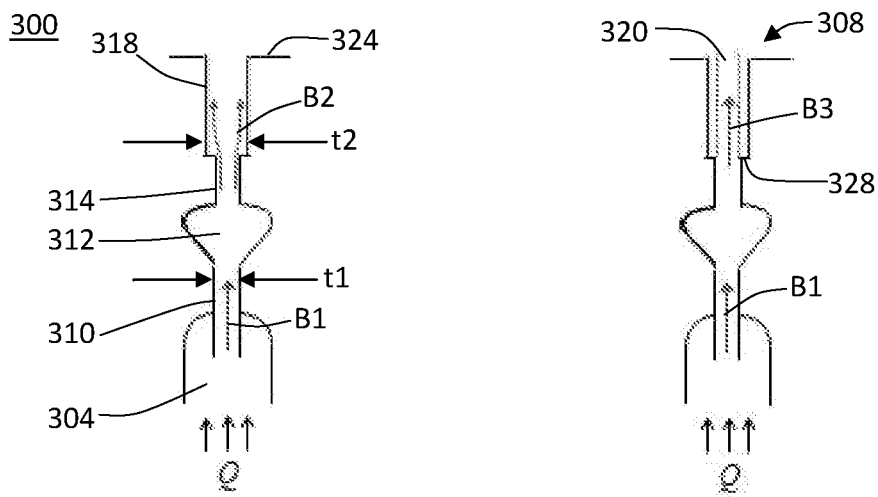
FIG. 2 presents a schematic of two stable (bi-stable) states of batch flow for dies comprising slots with a divot spaced toward a discharge face from the intersection of the feedholes with the slots (feedhole-slot intersection) and a wide portion extending into the die at the discharge face to strengthen a peripheral region of a honeycomb extrudate, and associated performance characteristics according to first exemplary embodiments of the disclosure.

FIG. 2 presents a schematic of the two stable (bi-stable) states of batch flow for dies comprising slots with a divot spaced toward a discharge face from the intersection of the feedholes with the slots (feedhole-slot intersection) and a wide portion extending into the die at the discharge face to strengthen the peripheral region of the honeycomb extrudate, and associated performance characteristics according to first exemplary embodiments of the disclosure. FIG. 2 illustrates batch flow "Q" in a die body feedhole 304 of die 300. Batch from the feedhole 304 flows into the first exemplary reinforcement slot 308 indicated by batch flow arrow "B1" in an upstream portion 310 of reinforcement slot 308. The upstream slot portion 310 can be the nominal slot width "t1". The nominal slot width "t1" can be the slot width of the slots in the bulk region of the die 300.

The slot comprises an upstream portion, a divot portion, and an exit portion (wide portion). Batch from the upstream slot portion 310 flows into divot 312, into a downstream slot portion 314, and then into wide slot portion 318. The batch exits the reinforcement slot 308 at a slot exit portion 320 in the die discharge surface 324. The downstream slot portion 314 can also comprise the nominal slot width "t1" and the wide portion 318 can comprise a wide slot width "t2", where wide slot width "t2" is greater than the nominal slot width "t1" such that first exemplary reinforcement slot 308 comprises a downstream facing step 328. As mentioned, the wide portion 318 can become progressively wider in slots disposed toward the outer periphery such that a second reinforcement slot 308 may comprise a wide portion 318 of "t3" where "t3" is greater than the wide slot width "t2".

Stable batch flow state "B2" represents the batch-on-batch flow over the forward facing step 328. State "B2" results in higher than nominal impedance, that is, the impedance of batch flow through a slot of nominal width "t1" from the feedhole 304 to divot 312 and from divot 312 to discharge surface 324. State "B2" higher than nominal impedance occurs in the wide slot portion 318 of the first exemplary reinforcement region while the wide slot portion 318 can be well filled with batch at or close to its design dimension; less batch flows in the wide slot portion 318 than in the bulk region of nominal slot width that can result in web tearing defects.

Stable batch flow state "B3" represents the stable state over the forward facing step 328 with a constant lower than nominal impedance, but with the wide slot portion 318 not well filled to its designed dimension. State "B3" provides a constant impedance independent of wide slot width "t2" or "t3" since the wide slot portion 318 is not filled in the width direction perpendicular to batch flow direction "A". The lower than nominal impedance of state "B3" results in too much batch flow or a higher web velocity in the first exemplary reinforcement region and buckled webs in the peripheral region 220 of the honeycomb body 220.

Neither of the bi-stable states "B2", "B3" can provide the progressively decreasing batch flow impedance profile as the slot wide portion 318 is progressively widened towards the outer periphery 206 of the honeycomb extrudate 200 which is required to achieve the strengthened honeycomb body 200 having thicker peripheral walls 210.

Figure 3:
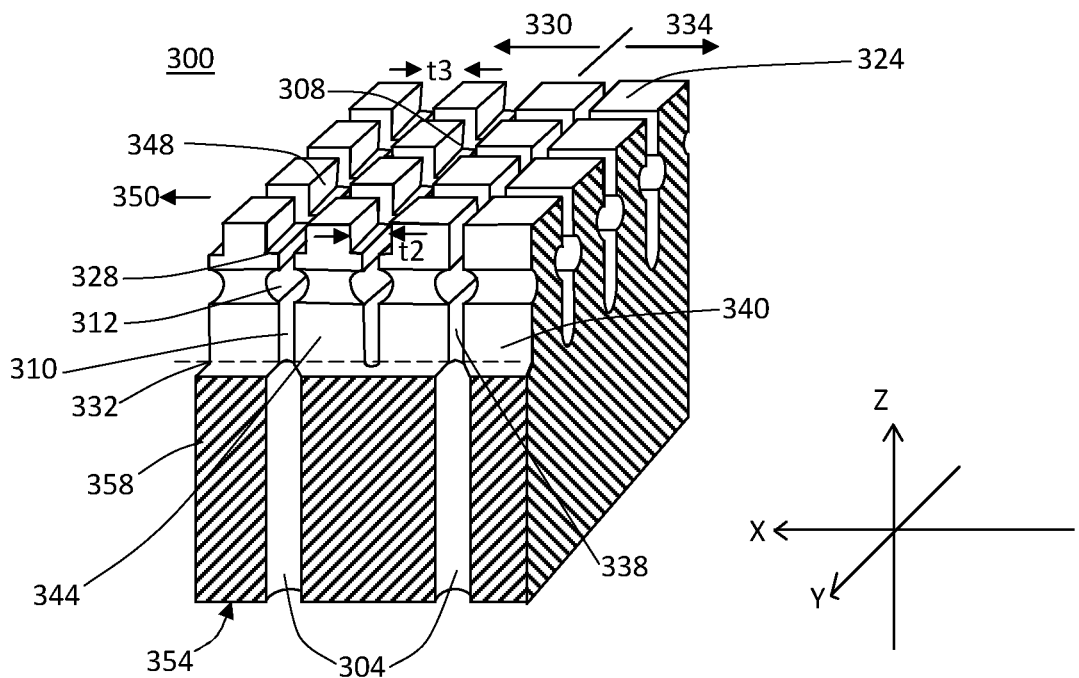
FIG. 3 is a schematic showing a partial sectional view of a die comprising slots with a divot spaced toward a discharge face from the intersection with the feedholes and a wide portion at the discharge face to strengthen a peripheral region of a honeycomb extrudate according to first exemplary embodiments of the disclosure.

FIG. 3 is a schematic showing a partial sectional view of a die 300 comprising slots with a divot 312 spaced toward a discharge face 324 from the intersection 332 with the feedholes 304, a wide portion 318 at the discharge face 324 to strengthen a peripheral region 220 of a honeycomb extrudate 200 in the reinforcement region 330, and a bulk nominal section 334 corresponding to the bulk region 218 of the honeycomb body 200 according to first exemplary embodiments of the disclosure. The nominal slots 338 in the bulk region 334 are bounded by nominal pins 340 and reinforcement region slots 308 are bounded by reinforcement region pins 344. A reinforcement region slot 348 toward the die outer periphery 350 from the reinforcement region slot 308 can comprise a wide portion 318 of width "t3" that is greater than the reinforcement region slot 308 wide portion 318 of width "t2". The feedholes 304 extend from the die inlet surface 354 into the die body 358.

Figure 4:
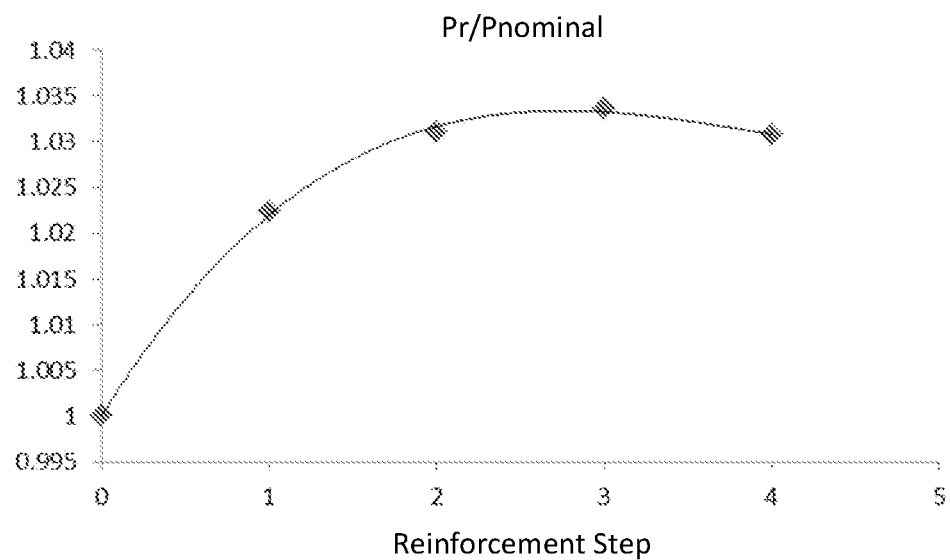
FIG. 4 is a graphical plot of computed impedance profile in bi-stable state "B2" of FIG. 2 for die slots with a divot spaced toward a discharge face from the intersection with the feedholes and a wide portion at the discharge face according to first exemplary embodiments of the disclosure.

FIG. 4 is a graphical plot of computed impedance profile in bi-stable state "B2" of FIG. 2 for die slots with a divot spaced toward a discharge face from the intersection with the feedholes and a wide portion at the discharge face according to first exemplary embodiments of the disclosure. Higher than nominal impedance (Pr/Pnominal>1) makes the peripheral strengthening zone (herein referred to as "reinforcement" zone) have lower batch flow rate than zone of slots without the wide portion at the discharge face (herein referred to as "nominal" or "bulk" region of "nominal" slots that intersect), which is opposite to the need of more batch flow in the reinforcement zone due to the wider slot and thicker honeycomb body wall in the reinforcement zone. Wall tearing is more likely to result and lead to extrusion defects. Pr/Pnominal=1 at Reinforcement Step 0, which corresponds to the bulk nominal region.

Figure 5:
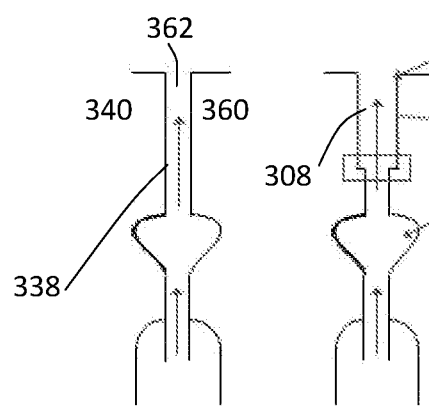
FIG. 5 shows the die slot with a divot spaced toward a discharge face from the intersection with the feedholes and a wide portion at the discharge face according to first exemplary embodiments of the disclosure and a nominal slot with a divot spaced toward a discharge face from the intersection with the feedholes.

FIG. 5 shows the die slot with a divot spaced toward a discharge face from the intersection with the feedholes and a wide portion at the discharge face according to first exemplary embodiments of the disclosure and a nominal die slot with a divot spaced toward a discharge face from the intersection with the feedholes.

Figure 6:
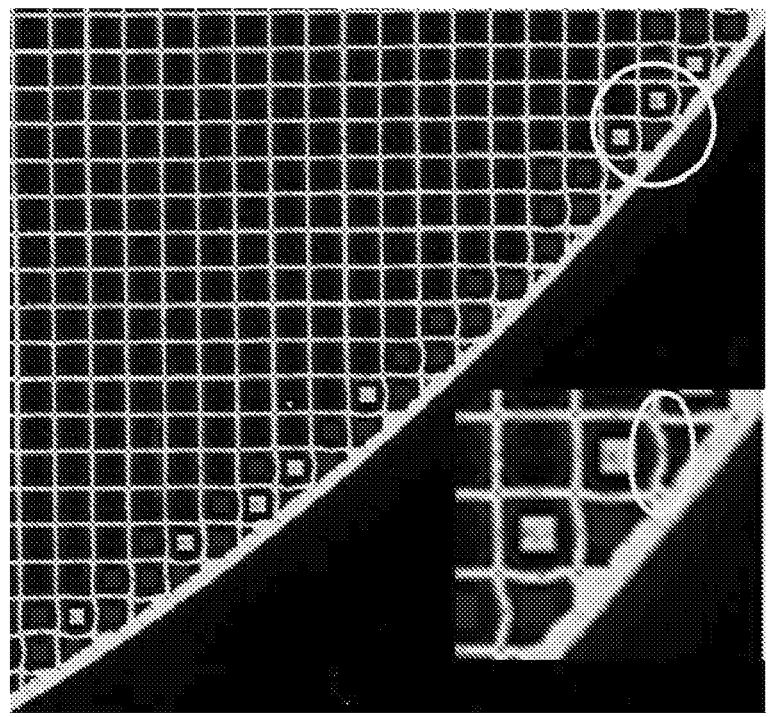
FIG. 6 is a photograph of a honeycomb body end face extruded through a die comprising peripheral die slots with a divot spaced toward a discharge face from the intersection with the feedholes and a wide portion at the discharge face (reinforcement zone) surrounding nominal slots with divots but without the wide portion at the discharge face.

FIG. 6 is a photograph of a honeycomb body end face extruded through a die comprising peripheral die slots with a divot spaced toward a discharge face from the intersection with the feedholes and a wide portion at the discharge face (reinforcement zone) surrounding nominal slots with divots but without the wide portion at the discharge face. The extrusion defects evident in the honeycomb body from this die design include peripheral distortion of the walls and walls less than design thickness due to state "B3" of batch flow in the reinforcement zone shown in FIG. 2. The inset provides a detailed view of the wall defect in the first exemplary peripheral reinforcement region.

Figure 7:
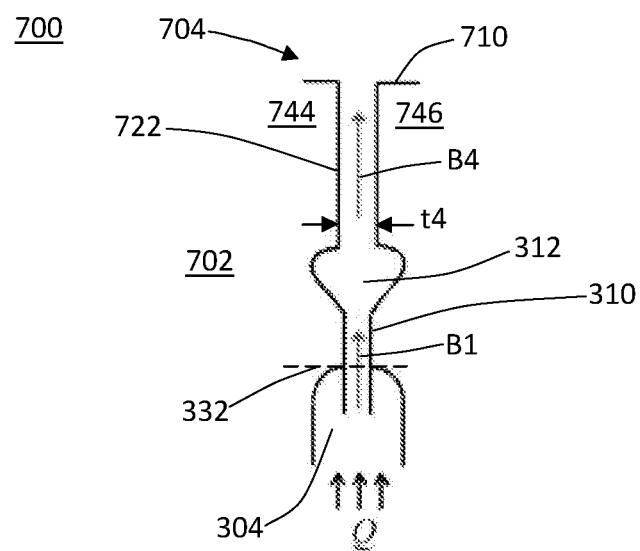
FIG. 7 is a schematic cross section of peripheral die slot with a divot spaced toward a discharge face from the intersection with the feedholes and a wide portion extending into the die at the discharge face in a reinforcement zone surrounding nominal slots with divots but without the wide portion at the discharge face according to second exemplary embodiments of the disclosure

FIG. 7 is a schematic cross section of a die 700 comprising a die body 702. The die body 702 comprises a peripheral die slot 704 with a divot 312 spaced toward a discharge face 710 from the intersection 332 with the feedholes 304 (feedhole-slot intersection 332) and a wide portion 722 extending into the die at the discharge face in a reinforcement zone surrounding nominal slots 338 with divots 312 but without the wide portion 722 at the discharge face 710 according to second exemplary embodiments of the disclosure. As illustrated, the wide portion 722 extends from the discharge surface 710 to the downstream portion of the divot 312 according to second exemplary embodiments of the disclosure. Having the wide portion 722 extend from the discharge surface 710 to the divot 312 eliminates the downstream facing step 328 and the bi-stable batch flow states "B2" and "B3" of FIG. 2. Batch flow "B4" in slot wide portion 722 fills the slot width "t4" and has lower batch impedance than the nominal slot 338. The slot 702 comprises an upstream portion 310, a divot portion 312, and an exit portion (wide portion) 722.

The die 700 comprises at least two adjacent pins 744, 746 comprising facing sides bounding the slot 704. The facing sides of the pins 744, 746 comprise a feed section bounding the slot upstream portion 310, a divot section bounding the divot 312 and an discharge section bounding the slot wide portion 722 (discharge portion). The die 700 may further comprise at least two other adjacent pins 340, 360 comprising facing sides (FIG. 5) bounding the nominal slot 338. The facing sides of the pins 340, 360 comprise a feed section bounding the slot upstream portion 310, a divot section bounding the divot 312 and a discharge section bounding the slot discharge portion 362. The die 700 may further comprise a pin comprising a first facing side comprising a feed section bounding the slot upstream portion 310, a divot section bounding the divot 312 and a discharge section bounding the slot wide portion 722, and a second facing side comprising a feed section bounding the slot upstream portion 310, a divot section bounding the divot 312 and a discharge section bounding the slot discharge portion 362. The slot 338, 704 is wider at the divot 312 than portions of the slot upstream 310 and downstream 318, 362, 722 of said divot.

Figure 8:
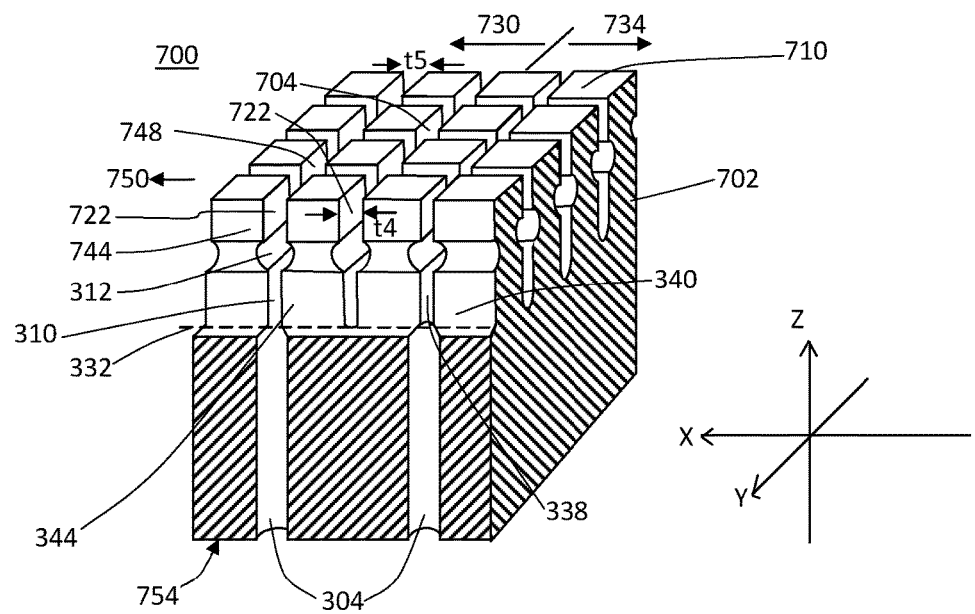
FIG. 8 is a schematic showing a partial sectional view of a die comprising at least some of the slots each with a divot spaced toward a discharge surface from the intersection with the feedholes and a wide portion at the discharge surface extending into the die body to the divot to strengthen a peripheral region of a honeycomb extrudate according to second exemplary embodiments of the disclosure.

FIG. 8 is a schematic showing a partial sectional view of the die 700 comprising at least some of the slots 338, 704 each with a divot 312 spaced toward a discharge surface 710 from the intersection 332 with the feedholes 304 and a wide portion 722 at the discharge surface 710 extending into the die body 702 to the divot 312 to strengthen a peripheral region 220 of a honeycomb extrudate 200 in the reinforcement region 730, and a bulk nominal section 734 corresponding to the bulk region 218 of the honeycomb body 200 according to second exemplary embodiments of the disclosure. The nominal slots 338 in the bulk region 734 are bounded by nominal pins 340 and reinforcement region slots 704 are bounded by reinforcement region pins 744, 746. A reinforcement region slot 748 toward the die outer periphery 750 from the reinforcement region slot 704 can comprise a wide portion 722 of width "t5" that is greater than the reinforcement region slot 704 wide portion 722 of width "t4". In alternate embodiments, the reinforcement region can comprise at least two slots 704 with wide portion 722 of one width "t4". In alternate embodiments, the reinforcement region can comprise all slots 704 with wide portion 722 of one width "t4". The feedholes 304 extend from the die inlet surface 754 into the die body 702.

Figure 9:
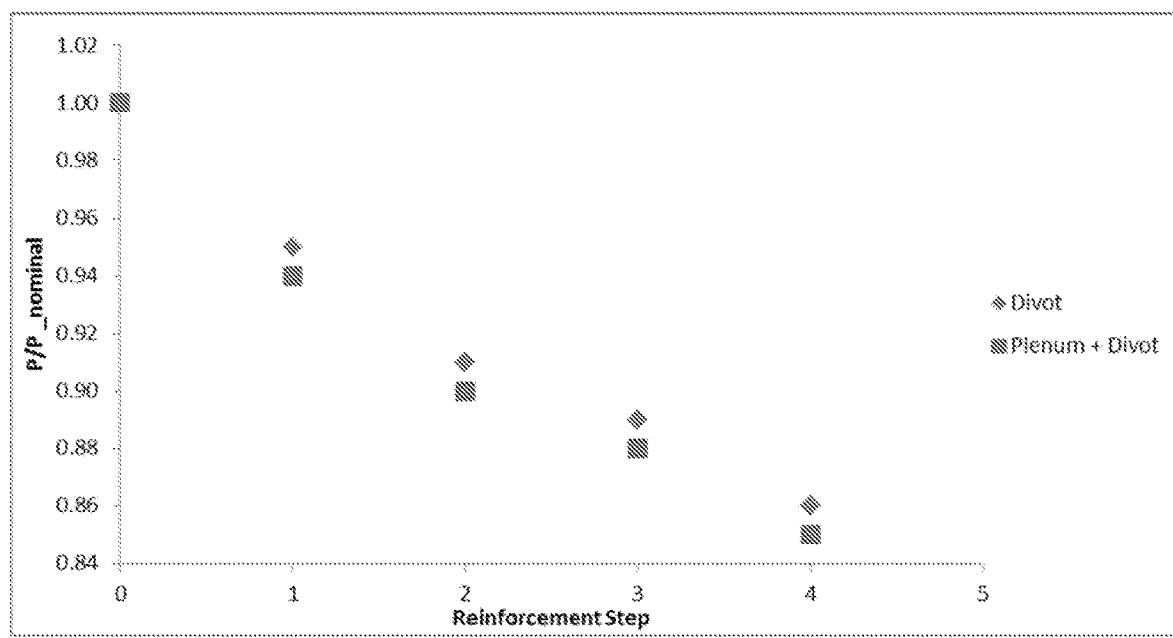
FIG. 9 is a graphical plot of computed impedance profile in the batch flow state "B4" of FIG. 7 for die slots with at least some of the slots each comprising a divot spaced toward a discharge face from the intersection with the feedholes and a wide portion at the discharge surface extending into the die body to the divot according to second exemplary embodiments of the disclosure.

FIG. 9 is a graphical plot of computed impedance profile in the batch flow state "B4" of FIG. 7 for die slots with at least some of the slots 704, 748 each comprising a divot 312 spaced toward a discharge face 710 from the intersection 332 with the feedholes 304 and a wide portion 722 at the discharge surface 710 extending into the die body 702 to the divot 312 according to second exemplary embodiments of the disclosure. These exemplary embodiments provide the wide slot portion 722 in the reinforcement zone 730 to extend from the discharge surface 710 to the divot 312 effectively eliminating the downstream facing ("forward facing") step 328 and eliminating the bi-stable states "B2" and "B3" of the first exemplary embodiments. The resultant impedance profile shows lower than nominal impedance of the reinforcement zone slot 704, 748 that gets progressively lower toward the outer periphery 750 as the wide portion 722 becomes wider after each row of pins 744 (reinforcement step number). A lower impedance in the reinforcement zone slot 704, 748 that gets progressively lower toward the outer periphery 750 as the wide portion 722 becomes progressively wider is what is needed to achieve the correct batch flow state "B4" in slots of the reinforcement zone 730 to extrude a honeycomb body 200 with wide walls 204 in the reinforcement region 220 that become progressively wider toward the outer periphery 206 of the honeycomb body 200.

Figure 10:
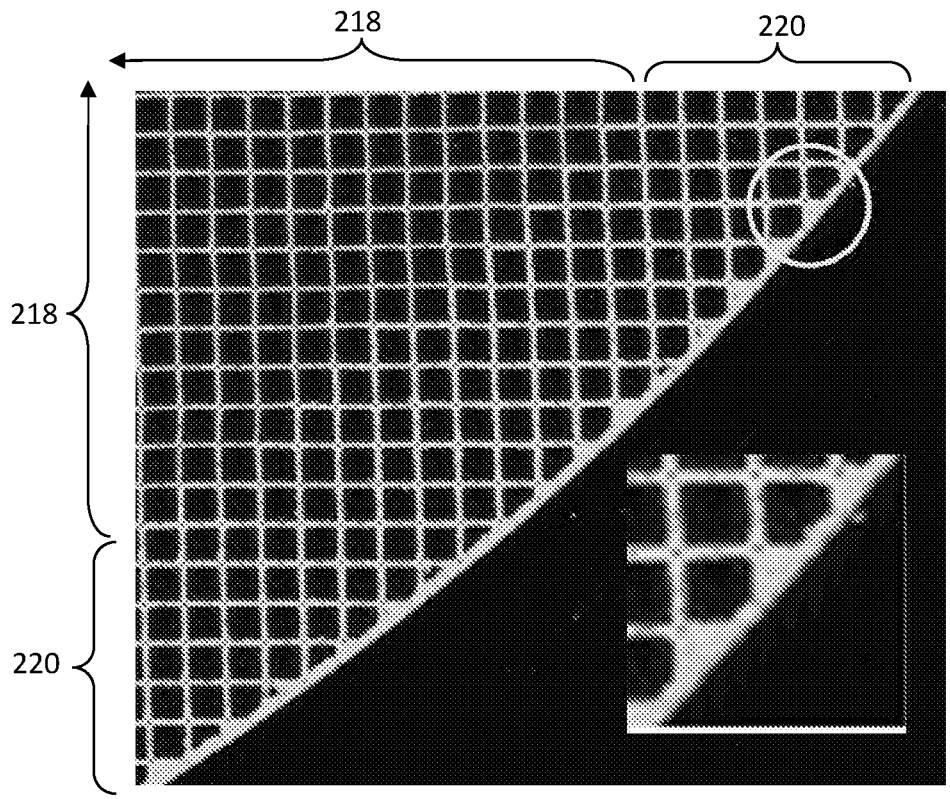
FIG. 10 is a photograph of a honeycomb body end face extruded through a die comprising peripheral die slots with at least some of the slots each comprising a divot spaced toward a discharge face from the intersection with the feedholes and a wide portion at the discharge face extending into the die body to the divot (reinforcement zone) surrounding nominal slots with divots but without the wide portion at the discharge face (bulk or nominal zone) according to second exemplary embodiments of the disclosure.

FIG. 10 is a photograph of a honeycomb body end face extruded through a die comprising peripheral die slots with at least some of the slots each comprising a divot spaced toward a discharge face from the intersection with the feedholes and a wide portion at the discharge face extending into the die body to the divot (reinforcement zone) 730 surrounding nominal slots with divots but without the wide portion at the discharge face (bulk or nominal zone) 734 according to second exemplary embodiments of the disclosure. The inset in FIG. 10 provides a detailed view of the walls 204 exhibiting little or no distortion (compare to FIG. 6). The die design according to these second exemplary embodiments provides an extruded honeycomb body 200 having a reinforcement region 220 of uniformly thick walls 204 that become progressively thicker toward the outer periphery 206 with little or no peripheral distortion indicating that the reinforcement slots 704, 748 are well filled with batch and the batch flows at the correct rate across the slot in the width direction "t4", "t5". The lack of extrusion defects in the honeycomb body 200 from this die design can be attributed to state "B4" of batch flow in the slots of the reinforcement zone shown in FIG. 7.

While not required in all aspects, it has been found that the divot 312 can be disposed in the side surface of the die pin 340, 744 spaced apart from the discharge surface 710 by not more than half of the length of the slot from the discharge surface 710 to the slot root at the intersection 332 with the feedhole 304. In some aspects, the divot 312 can be disposed in the side surface of the die pin 340, 744 spaced apart from the discharge surface 710 by about 5-7 times the slot width. The wide portion 722 extends from the discharge surface 710 to the downstream edge of the divot 312.

Exemplary embodiments of the honeycomb body 200 and the die 700 can comprise between about 100 and 1200 cells per square inch (cpsi). Typical cell wall thicknesses and corresponding die slot widths can range from about 0.025 mm to about 1.5 mm (about 1 to 60 mil). For example, honeycomb body 200 and die 700 geometries may be 400 cpsi with a wall/slot thickness of about 8 mil (400/8) or with a wall/slot thickness of about 6 mil (400/6). Other geometries include, for example, 100/17, 200/12, 200/19, 270/19, 350/3, 400/3, 400/4, 500/2, 600/2, 600/3. 600/4, 750/2, 900/2, 900/3, 1200/2, and even 750/1 and 900/1. As used herein, honeycomb body 200 is intended to include a generally honeycomb structure but is not strictly limited to a square structure. For example, hexagonal, octagonal, triangular, rectangular or any other suitable cell shape may be used. Also, while the cross section of the cellular honeycomb body 200 may be circular, it is not so limited, for example, the cross section can be elliptical, square, rectangular, or other desired shape, and a combination thereof.

Exemplary embodiments of the disclosure are further described with respect to certain exemplary and specific embodiments thereof, which are illustrative only and not intended to be limiting. In an example, a die may comprise a nominal slot thickness of 12 mil (0.012 in or 0.30 mm) and a reinforcement region of about 5 to 10 steps, for example, each step can be a pin width, a row of pins, several pin widths, or several rows of pins, where the slot wide portion width increases by about 0.75 mil (0.00075 inch or 0.019 mm) per step. In this example, the slot wide portion width at the outer periphery can be about 20 mil (0.020 in or 0.51 mm). In another example, a die may comprise a nominal slot width of 2 mil (0.002 in or 0.051 mm) and a reinforcement region of about 2 steps, where the slot wide portion width increases by about 0.3 mil (0.0076 mm) per step. In this example, the slot wide portion width at the outer periphery can be about 2.5 mil (0.064 mm). That is, the nominal slot width can be between about 2 mil (0.051 mm) and about 20 mil (0.51 mm) and the reinforcement region can comprise between about 2 and about 10 steps at between about 0.3 mil (0.0076 mm) and about 0.75 mil (0.019 mm) per step such that the slot wide portion width at the outer periphery can be between about 2.5 mil (0.064 mm) and about 20 mil (0.51 mm). In another example, a die may comprise a nominal slot width and a reinforcement region of about 1 step from the nominal slot width. In this example, the slot wide portion in the reinforcement zone is constant. In another example, a die may comprise a nominal slot width of 2 mil (0.051 mm) and a reinforcement region where the thickest slot wide portion is about 6 mils (0.152 mm) in this case the divot depth may be about 10 mils (0.254 mm) to about 42 mils (1.07 mm) from the discharge surface. In some exemplary embodiments the divot can be between about 25 mil (0.64 mm) and about 70 mil (1.78 mm) from the discharge surface.

Figure 11:
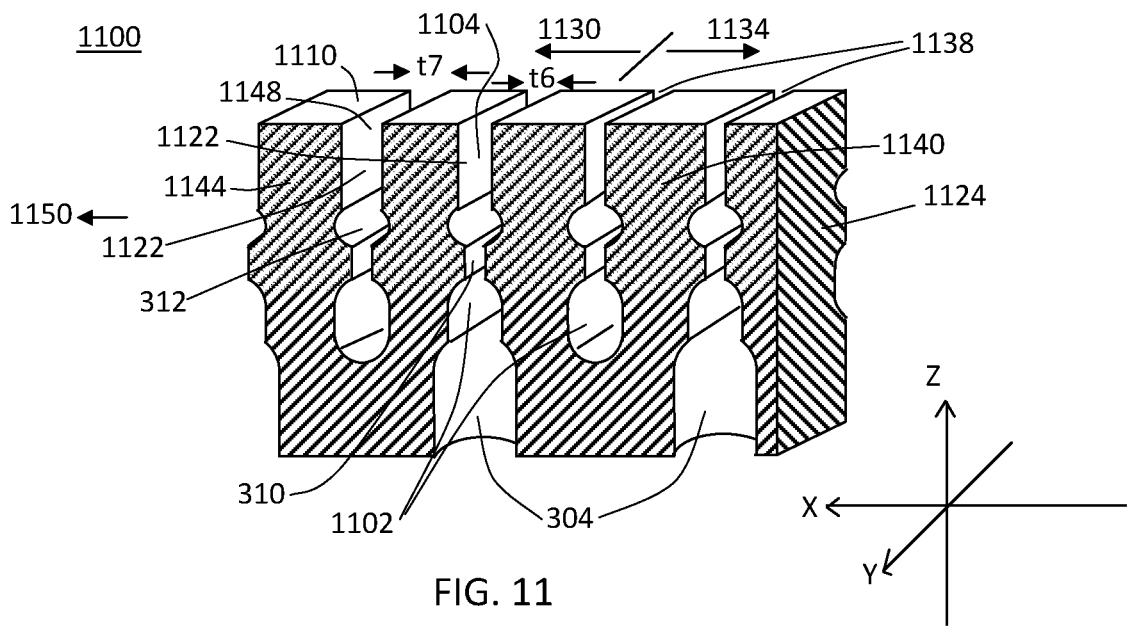
FIG. 11 is a schematic showing a partial sectional view of a die comprising a plenum connecting slots to feedholes, at least some of the slots each comprise a divot spaced toward a discharge surface from the intersection with the plenum and a wide portion at the discharge surface extending into the die body to the divot to strengthen a peripheral region of a honeycomb extrudate according to third exemplary embodiments of the disclosure.

FIG. 11 is a schematic showing a partial sectional view of a die 1100 comprising a plenum 1102 connecting slots to feedholes 304, at least some of the slots 1104 each comprise a divot 312 spaced toward a discharge surface 1110 from the intersection with the plenum 1102 and a wide portion 1122 at the discharge surface 1110 extending into the die body 1124 to the divot 312 to strengthen a peripheral region 220 of a honeycomb extrudate 200 in the reinforcement region 1130, and a bulk nominal section 1134 corresponding to the bulk region 218 of the honeycomb body 200 according to third exemplary embodiments of the disclosure. The nominal slots 1138 in the bulk region 1134 are bounded by nominal pins 1140 and reinforcement region slots 1104 are bounded by reinforcement region pins 1144. A reinforcement region slot 1148 toward the die outer periphery 1150 from the reinforcement region slot 1104 can comprise a wide portion 1122 of width "t7" that is greater than the reinforcement region slot 1104 wide portion 1122 of width "t6". The feedholes 304 extend from the die inlet surface 1154 into the die body 1124.

The plenum 1102, according to exemplary embodiments of the disclosure, provides additional advantages as disclosed in U.S. Provisional Patent Application No. 62/258,137, filed on Nov. 20, 2015, the entire contents of which are hereby incorporated by reference as if fully set forth herein. For example, the plenum 1102 can ease the pressure burden of narrower slots while keeping the slot length to width needed for reduced web swell, as well as provide for low batch flow sensitivities, e.g., a low sensitivity to upstream flow disruptions.

According to exemplary embodiments of this disclosure, the bi-stable state is reduced or eliminated for a divot die with reinforcement slot design. This avoids the peripheral web distortion of the honeycomb extrudate, from such causes as the web in the reinforcement zone not filling to its designed dimension, as well as web tearing from batch-on-batch impedance and pressure, which have been found to be frequent issues associated with the extrusion of honeycomb bodies with the peripheral reinforcement region feature. For dies without a divot, the slot wide portion in the reinforcement region can extend from the discharge surface to the pin root to avoid the bi-stable state of batch flow in the reinforcement region. In these exemplary embodiments, the interaction of the slot wide portion depth in the reinforcement zone and the divot position provides a batch flow benefit resulting in good extrusion quality.

Another advantage of the die comprising a reinforcement zone where the slot wide portion extends from the discharge surface to the divot is that first exemplary die designs, for example, as disclosed herein, can be retrofitted to the second exemplary design by electro-discharge machining (EDM), for example, by plunge EDM. Further, the die comprising a reinforcement zone where the slot wide portion extends from the discharge surface to the divot according to the second exemplary embodiments and the third exemplary embodiments of the disclosure provides balance of batch flow in the skin forming region that is less sensitive to implementation of a forming plate disposed upstream of the die for fissure reduction.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:

1. A honeycomb extrusion die, comprising:
a die body, comprising:
an inlet surface and a discharge surface opposite the inlet surface;
feedholes extending from the inlet surface into the die body;
an intersecting array of discharge slots extending into the die body from the discharge surface to connect with the feedholes at intersections within the die body, the intersecting array of discharge slots being formed by side surfaces of a plurality of pins bounded by the slots and extending into the die body from the discharge face,
wherein at least some of the side surfaces of the pins forming the walls of the slots comprise a divot spaced apart from the feedhole-slot intersection and spaced apart from the discharge surface, and
wherein the plurality of slots comprise:
a first group of the slots comprising a width W1 between adjacent pins at the discharge surface, and
a second group of the slots comprising a second width W2, greater than W1, between adjacent pins at the discharge surface, wherein the second width W2 is constant from the discharge surface to the divot.

2. The honeycomb extrusion die of claim 1, wherein the first group of the slots comprises at least some of the divots and W1 is constant from the discharge surface to the divot.

3. The honeycomb extrusion die of claim 1, wherein W1 is constant from the feedhole-slot intersection to the divot.

4. The honeycomb extrusion die of claim 1, wherein the slots in the second group of the slots are disposed toward a peripheral region of the die from the first group of the slots.

5. The honeycomb extrusion die of claim 1, wherein the second group of the slots surrounds the first group of the slots.

6. The honeycomb extrusion die of claim 1, wherein the plurality of slots further comprises a third group of the slots comprising a width W3, greater than W2, between adjacent pins at the discharge surface.

7. The honeycomb extrusion die of claim 1, wherein the third group of the slots comprises at least some of the divots and W3 is constant from the discharge surface to the divot.

8. The honeycomb extrusion die of claim 1, wherein the slots in the third group of the slots are disposed toward a peripheral region of the die from the second group of the slots.

9. The honeycomb extrusion die of claim 1, wherein the third group of the slots surrounds the second group of the slots.

10. The honeycomb extrusion die of claim 1, wherein the second group of the slots comprises at least some of the divots and W2 is constant from the discharge surface to the divot.

11. The honeycomb extrusion die of claim 1, wherein the difference between W1 and W2 is a step distance and the difference between W2 and W3 is the same step difference.

12. The honeycomb extrusion die of claim 1, wherein the slots comprise additional groups of the slots comprising progressively greater widths by the same step difference.

13. The honeycomb extrusion die of claim 1, wherein each of the additional groups of the slots of a progressively thicker width is disposed toward a periphery of the die from a group of the slots comprising a width of one less step difference.

14. The honeycomb extrusion die of claim 1, wherein each of the additional groups of the slots of a progressively thicker width is disposed surrounding a group of the slots comprising a width of one less step difference.

15. The honeycomb extrusion die of claim 1, wherein each of the additional groups of the slots comprises at least some of the divots and the width of the additional groups of the slots is constant from the discharge surface to the divot.

16. The honeycomb extrusion die of claim 1, wherein the number of additional groups of the slots is between 1 and 8.

17. The honeycomb extrusion die of claim 1, wherein the third group of the slots is disposed adjacent a skin forming region.

18. The honeycomb extrusion die of claim 1, wherein the divot is spaced apart from the discharge surface by not more than half of the distance from the discharge surface to the intersection of the slots with the feedholes.

19. The honeycomb extrusion die of claim 1, wherein the divot is spaced apart from the discharge surface in a range from about 5 to 7 times W1 to about 5 to 7 times W2.

20. The honeycomb extrusion die of claim 1, wherein the divot is spaced apart from the discharge surface in a range from about 5 times W1 to about 7 times W2.

21. The honeycomb extrusion die of claim 1, wherein at least some of the side surfaces of the pins forming the walls of the slots comprise a plenum disposed at the feedhole-slot intersection and spaced apart from the divot.

22. A method of manufacturing a honeycomb body, comprising extruding a batch material through the die of claim 1.

\* \* \* \* \*

UNITED STATES PATENT AND TRADEMARK OFFICE
CERTIFICATE OF CORRECTION

| | |
|---|---|
| PATENT NO. | : 11,045,975 B2 |
| APPLICATION NO. | : 16/077117 |
| DATED | : June 29, 2021 |
| INVENTOR(S) | : John Wilbur Allard et al. |

It is certified that error appears in the above-identified patent and that said Letters Patent is hereby corrected as shown below:

In the Specification

In Column 1, Line 14, after "contents of" delete "which".

Signed and Sealed this
First Day of August, 2023

Katherine Kelly Vidal
*Director of the United States Patent and Trademark Office*